US011168664B2

(12) United States Patent
Nielsen (10) Patent No.: US 11,168,664 B2
(45) Date of Patent: Nov. 9, 2021

(54) CONTROL METHOD FOR A WIND TURBINE

(71) Applicant: VESTAS WIND SYSTEMS A/S, Aarhus N (DK)

(72) Inventor: Johnny Nielsen, Svenstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 190 days.

(21) Appl. No.: 16/088,415

(22) PCT Filed: Mar. 30, 2017

(86) PCT No.: PCT/DK2017/050096
§ 371 (c)(1),
(2) Date: Sep. 25, 2018

(87) PCT Pub. No.: WO2017/167345
PCT Pub. Date: Oct. 5, 2017

(65) Prior Publication Data
US 2020/0300221 A1    Sep. 24, 2020

(30) Foreign Application Priority Data
Mar. 31, 2016 (DK) .......................... PA 2016 70179

(51) Int. Cl.
*F03D 7/02* (2006.01)
*F03D 7/04* (2006.01)

(52) U.S. Cl.
CPC ........... *F03D 7/042* (2013.01); *F03D 7/0204* (2013.01); *F03D 7/0224* (2013.01)

(58) Field of Classification Search
CPC ...... F03D 7/042; F03D 7/0204; F03D 7/0224; F03D 7/043; F03D 7/046; F05B 2270/802
(Continued)

(56) References Cited

U.S. PATENT DOCUMENTS 8,157,521 B2 *  4/2012  Minami ................. F03D 7/026
                                                 416/1
8,310,073 B2 * 11/2012  Enevoldsen .......... F03D 7/0204
                                                 290/44
(Continued)

FOREIGN PATENT DOCUMENTS

CN         101016879 A         8/2007
CN         101776695 A         7/2010
(Continued)

OTHER PUBLICATIONS

PCT Written Opinion of the International Searching Authority for Application No. PCT/DK2017/050096 dated Dec. 6, 2017.
(Continued)

*Primary Examiner* — Justin D Seabe
(74) *Attorney, Agent, or Firm* — Patterson + Sheridan, LLP (57) ABSTRACT

Controlling a wind turbine comprising a wind sensor, a number of pitch-adjustable rotor blades, a yawing system, and a control system for yawing the wind turbine rotor relative to the wind and for changing the pitch of the rotor blades. A wind parameter is measured by the wind sensor, and is indicative of the wind speed and/or the wind direction relative to the wind turbine. At least a first and a second set of wind correction parameters for different production modes of the wind turbine are obtained. The production mode of the wind turbine is then determined, which may be one of at least normal operation or non-production, and the measured wind parameter is then adjusted as a function of the set of wind correction parameters corresponding to the production mode at the time of adjusting. Hereby a more precise wind parameter is obtained which can be used in the controlling of the turbine.

15 Claims, 5 Drawing Sheets

(58) Field of Classification Search
USPC .................................................. 290/44, 55
See application file for complete search history.

(56) References Cited

U.S. PATENT DOCUMENTS

| 9,551,321 | B2 * | 1/2017 | Gerber ........................ F03D 7/02 |
| 9,845,790 | B2 * | 12/2017 | de Boer ....................... F03D 9/25 |
| 2013/0121825 | A1 | 5/2013 | Miranda | |
| 2014/0306451 | A1 | 10/2014 | Abdur-Rahim et al. | |

FOREIGN PATENT DOCUMENTS

| CN | 103850876 A | 6/2014 |
| CN | 105298748 A | 2/2016 |
| EP | 1793123 A2 | 6/2007 |
| EP | 2154362 A1 | 2/2010 |
| EP | 2182205 A1 | 5/2010 |
| EP | 2375061 A1 | 10/2011 |
| EP | 2679814 A1 | 1/2014 |
| GB | 2477968 A | 8/2011 |
| WO | 2015077337 A1 | 5/2015 |
| WO | 2017167345 A1 | 10/2017 |

OTHER PUBLICATIONS

I. Antoniou et al: "Nacelle anemometry on a 1 MW wind turbine: Comparing the power performance results by use of the nacelle or mast anemometer", Risoe-R-941 (EN), Aug. 1, 1997 (Aug. 1, 1997), XP055356510, Retrieved from the Internet: URL:http://orbit.dtu.dk/fedora/objects/orbit:91269/datastreams/ file_7753492/content [retrieved on Mar. 20, 2017].
PCT International Search Report for Application No. PCT/DK2017/050096 dated Dec. 6, 2017.
First Technical Examination for Application No. PA 2006 70179 dated Nov. 25, 2016.
Chinese Office Action for Application No. 201780020928.8 dated Jul. 26, 2019.

* cited by examiner

CONTROL METHOD FOR A WIND TURBINE

FIELD OF THE INVENTION

The present invention relates to a method of controlling a wind turbine, the wind turbine comprising a wind sensor, a number of pitch-adjustable rotor blades, a yawing system, and a control system for yawing the wind turbine rotor relative to the wind and for changing the pitch of the rotor blades with the aim of controlling the wind turbine optimally under different and changing wind conditions. The invention furthermore relates to control system for performing the control method and a wind turbine comprising such control system.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to optimize the power production and reduce the loads of the turbine it is important to know the wind speed and the relative wind direction of the free flow wind. Most often the wind speed and the wind direction are measured by wind sensors placed on different positions on top of the nacelle and the wind turbine rotor is then optimally yawed to face the wind and the wind turbine controlled according to the wind speed. The wind speed and wind direction are here and in the following referred to in common as wind parameters.

If the wind direction measurements are off even by one or a few degrees, the resulting misalignment of the turbine rotor may cause increased and different loadings on the wind turbine blades than anticipated, and thereby increased wear and fatigue on the blades, blade root connections, bearings etc. Further, a misalignment of the turbine rotor causes a non-negligible reduction in the power production over time.

Similarly, if the wind speed measurements are off by even just a few percent, the wind turbine may be operated non-optimally causing increased loads and wear or on the other hand a reduced power production.

The measurements from a wind sensor may however far from always be accurate for one reason because the rotor disturbs the free flow wind before reaching the wind sensor. The influence from the rotor on the wind parameter measurements have been seen generally to be more pronounced and significant the larger the rotor.

One way to compensate for this problem is by calibrating or continuously correcting the wind sensor measurements by a basic set of Wind Correction Parameters (WCP). These parameters are typically found on a prototype turbine by comparing the measurements from the wind sensors on the turbine with measurements from a nearby Met Mast. Having established a set of wind correction parameters, these parameters can then be used to correct the wind parameter as measured by a wind sensor on all other wind turbines of the same type.

However, it has been found that rotor influence on the wind sensor measurements and thereby on the inaccuracy of the determined wind parameters may also depend strongly on the way the rotor is operated, for example on the pitch angles, and on the rotational speed of the rotor. This also means that the accuracy of the sensed wind parameters changes indirectly as a function of the wind speed. This problem may to some extend be reduced by using a set of wind correction parameters which are a function of the wind speed. However, such correction does not fully capture the influence on the rotor operation on the wind measurements since the wind turbine rotor may be operated differently at the same wind speed.

As an example, it has been seen that the measured wind speed may drop up to 10 m/s when a wind turbine reaches its cut-out wind speed at for instance 35 m/s where the wind turbine is stopped. The measured wind speed may therefore drop with the stopping of the wind turbine from 35 m/s to 25 m/s, thereby potentially causing the wind turbine controller to start up the wind turbine again right away with full production at the real wind speed of 35 m/s exceeding the design loads of the turbine.

OBJECT OF THE INVENTION

It is an object of embodiments of the present invention to provide a control method for a wind turbine which obviate or reduce some of the above mentioned problems in the known wind direction and wind speed measurement methods.

It is therefore also an object of embodiments of the present invention to overcome or at least reduce some or all of the above described disadvantages by providing a wind turbine controlling method of reduced risk of misalignment of the wind turbine rotor or non-optimal pitching of the rotor blades.

A further object of embodiments of the invention is to provide a more precise and robust yet effective method to calibrate or correct the measurements from an existing wind sensor with reduced sensitivity to the influence by the rotor and the operational mode of the wind turbine.

A further object of embodiments of the invention is to provide a wind parameter calibration method with improved accuracy.

It is a further object of the invention to provide a control method for a wind turbine maintaining the annual energy production (AEP) of the wind turbine while reducing the fatigue loading or wear on the turbine due to non-optimal control of the wind turbine.

It is a further object of embodiments of the invention to provide a method of improving the wind parameter measurements obtained by conventional wind direction and wind speed sensors and to provide a method of calibrating measurements from a wind sensor which may be implemented on existing equipment.

So, in a first aspect the present invention relates to a method of controlling a wind turbine, the wind turbine comprising a wind sensor, a number of pitch-adjustable rotor blades, a yawing system, and a control system for yawing the wind turbine rotor relative to the wind and for changing the pitch of the rotor blades, the method comprising:

measuring a wind parameter by the wind sensor, wherein the wind parameter is indicative of the wind speed and/or the wind direction relative to the wind turbine;

obtaining a pre-determined first set of wind correction parameters, the first set comprising wind correction parameters for the adjustment of the wind parameter during normal operation;

obtaining a pre-determined second set of wind correction parameters, the second set comprising wind correction parameters for the adjustment of the wind parameter during non-production;

determining a production mode of the wind turbine, wherein the production mode comprises one of at least normal operation and non-production;

adjusting the wind parameter as a function of the set of wind correction parameters corresponding to the production mode at the time of adjusting;

determining a control parameter of the wind turbine as a function of the adjusted wind parameter; and controlling the wind turbine according to the control parameter.

Hereby is obtained a simple yet effective control method improving the determination of the wind speed and/or the wind direction relative to the wind turbine and reducing the risk of misaligning the rotor relative to the wind or non-optimal pitching of rotor blades, as the control parameter is based on adjusted or calibrated wind direction measurements taking into the operational state of the wind turbine and thereby how the rotor influences the wind sensor.

By the proposed method using at least a first and second set of wind correction parameters corresponding to different production modes is more accurately captured how the wind sensor measurements are often seen to vary significantly not only at different wind speeds but also seen to vary significantly different under different rotor configurations or rotor modes such as for example during normal operation or during non-production.

Furthermore is obtained a simple and effective control method for reducing the loads and wear on the wind turbine components, as the control parameter is determined based on the adjusted wind parameter measurements whereby is obtained a better alignment of the rotor to the wind as actually experienced by the rotor and a more precise controlling corresponding to the actual wind conditions. Also, the wind turbine is better protected as a more precise alignment of the rotor to the free wind and pitching corresponding to the actual wind conditions generally results in better control of the loads on the wind turbine blades and reduced wear on components. As a further and significant advantage the increased accuracy of non-production wind speed is essential for the service technician to determine if it is safe or not to enter the turbine especially when going up into the Nacelle.

It has been found that the wind parameter measurements used to determine the optimal control parameters of the wind turbine can advantageously be adjusted based on a number of sets of wind correction parameters in dependence of the production mode or operational mode of the wind turbine. Each set of wind correction parameters has been pre-determined and correspond to a specific production mode such as the modes of normal operation and non-production. The measured wind parameter is then adjusted based on the set of wind correction parameters corresponding to the production mode of the wind turbine at the time of adjusting. By measuring and adjusting a wind parameter is obtained a more precise method with improved accuracy better capturing that the measured wind direction and wind speed are to be adjusted differently under different operating condition of the wind turbine and under different wind speeds, and especially in dependence on whether the wind turbine is in normal production or in non-production.

The proposed control method wherein the measured wind parameter is adjusted in dependence of the production mode of the wind turbine has been seen to yield a more robust and stable control method where the risk of unintentional more or less abrupt switching between different control schemes has been significantly reduced or even removed. In this way, the earlier mentioned problem of switching between cutting out and starting up again at wind speed around the cut-out wind of the wind turbine (often in the range of 25-35 m/s) due to the otherwise significant change in wind speed measurements when the rotor operation is changed from normal operation to non-production has been seen to be avoided. This effect is obtained because of the adjustment of the measured wind parameter taking into account the production mode of the wind turbine and thereby how the rotor affects the wind flow.

The control parameter may preferably be a yaw parameter for the wind turbine and the controlling of the wind turbine then comprises yawing the wind turbine according to the yawing parameter. Hereby the yawing parameter of the turbine is based on more accurate wind direction and wind speed data improving the control of the wind turbine.

The control parameter may alternatively or additionally comprise other control parameters which to some extend depends on the wind direction and wind speed, such as a pitch parameter of one or more of the rotor blades, and/or a rotational speed of the rotor.

In an embodiment the wind parameter is a wind speed as measured for example by an anemometer.

Alternatively or additionally, the wind parameter is a wind direction as measured by the wind sensor.

The sets of wind correction parameters may be pre-determined on the same or on another wind turbine and may have been determined individually for example over different time periods or in parallel. The wind correction parameters may have been established by comparative measurements of the wind parameter on a wind turbine and on a nearby MET mast or another type of mast where the measurements are unaffected by a wind turbine rotor.

Some or all of the sets of wind correction parameters may comprise wind correction parameters for the adjustment of the measured wind parameter(s) for example in dependence of the wind speed and/or other parameters such as the temperature, humidity, time of year, height etc. The wind correction parameters for any given set may be given in a look-up table or as a functional expression of any one or more of these parameters.

The sets of wind correction parameters may for example express how a wind parameter at a given wind speed should be corrected or adjusted in order to yield the wind parameter more accurately.

The adjusting of the wind parameter as a function of the set of wind correction parameters may be performed by an addition of the wind correction parameter.

Alternatively, the adjusting of the wind parameter as a function of the set of wind correction parameters may be performed by a multiplication of the wind correction parameter.

The control method may be implemented on new or existing wind turbines as pure software implementation with no need for any additional hardware on the turbine or may be implemented as a combination of software and hardware.

In an embodiment, the wind correction parameters in the first set of wind correction parameters are a function of a wind speed. Hereby is obtained that the measured wind parameter when the wind turbine is in normal production is adjusted as a function of the wind speed. During normal production, the pitch angle of the rotor blades and/or the rotational speed of the rotor are often changed either with a view to maximise the energy extracted from the wind or with a view to reduce the loads acting on the rotor. Hereby the rotor changes the wind flow thereby affecting the wind parameter measurements which therefore advantageously are adjusted correspondingly.

In an embodiment, the wind correction parameters in the first set of wind correction parameters are a function of a power of the wind turbine. Hereby is obtained that the measured wind parameter during normal production is adjusted in dependence of the power of the wind turbine reflecting and capturing that the rotor typically affects the wind field differently and thereby the wind sensors differently at different power production levels of the wind turbine. The wind parameter adjustment during normal production thereby becomes more precise.

Generally, the power of the wind turbine may be determined as the output power of the generator or the power delivered to the grid or a combination hereof.

The production mode is in one embodiment determined based on a power of the wind turbine.

In an embodiment a power by the wind turbine larger than a pre-defined power threshold defines the production mode of normal operation. The power threshold may be in the range of –50 kW-0 kW if the power is the grid power. If the power is the generator output power, the power threshold may be in the range of 0-10 kW, such that a power larger than the power threshold indicates that the wind turbine is producing and that the measured wind parameters should then be adjusted according to the first set of wind correction parameters. Lower power values may then indicate the wind turbine is in the production mode of non-production and that the wind parameters are then to be adjusted according to the second set of wind correction parameters. Hereby the wind parameters are more accurately adjusted simple by considering the power of the wind turbine which most often is a parameter already at hand or at least readily obtainable.

Alternatively or additionally, the wind turbine is simply determined to be in the production mode of normal production when the wind turbine generator is connected to the grid, is powering up, or is in production.

In a further embodiment of the invention, the production mode is determined based on a pitch angle of a rotor blade. For example, a relatively large pitch angle of one or more of the rotor blades can be used to indicate that the wind turbine is not producing and that the production mode is the non-production. Typically pitch angles in the range of or larger than 14-25 degrees indicate that the rotor blades are more or less fully pitched out and the wind turbine in non-production for some reason. This could be because of high wind speeds but could likewise be during maintenance or the like.

In a further embodiment of the invention, the production mode is determined based on a rotational speed of the wind turbine rotor for example such that a rotational speed above a certain rotational speed threshold defines a production mode of normal production.

The production mode of the wind turbine may be determined by considering each of the parameters mentioned in the above of power, pitch angle and rotational speed or by considering combinations hereof.

In a further embodiment, the control method further comprises obtaining a pre-determined third set of wind correction parameters, the third set comprising wind correction parameters for the adjustment of the wind parameter during idle operation. The method then comprises determining a production mode of the wind turbine, wherein the production mode comprises one of at least normal operation, non-production and idle operation, and the wind parameter is then adjusted as a function of the set of wind correction parameters corresponding to the production mode at the time of adjusting.

During idle operation the rotor is typically rotating slowly however without the generator being coupled to the grid. The wind turbine may typically be idling a low wind speeds and before initiating normal production. By also considering this third production mode of idle operation is obtained a more accurate adjustment of the measured wind parameters and thereby a more robust and optimal control method where the wind turbine is at all times controlled according to the actual wind conditions.

In yet a further embodiment of the invention, the wind parameter is further adjusted as a function of earlier wind parameters. Hereby, relatively abrupt changes to the wind parameter may be avoided and whereby the risk of switching back and forth between values may be reduced or completely avoided. As an example, a relative wind direction may be adjusted by a subtraction of a wind correction parameter, and further a subtraction of the change in wind direction from the last to the present adjustment and times a gain factor.

In a further aspect the present invention relates to a control system for a wind turbine configured to perform the steps of:

receiving a wind parameter as measured by a wind sensor, wherein the wind parameter is indicative of the wind direction relative to the wind turbine and/or the wind speed;

receiving a pre-determined first set of wind correction parameters, the first set comprising wind correction parameters for the adjustment of the wind parameter during normal operation;

receiving a pre-determined second set of wind correction parameters, the second set comprising wind correction parameters for the adjustment of the wind parameter during non-production;

determining a production mode of the wind turbine, wherein the production mode comprises one of at least normal operation and non-production;

adjusting the wind parameter as a function of the set of wind correction parameters corresponding to the production mode at the time of adjusting;

determining a control parameter of the wind turbine as a function of the adjusted wind parameter; and controlling the wind turbine according to the control parameter.

In a further aspect the present invention relates to a wind turbine comprising a wind sensor, a number of pitch-adjustable rotor blades, a yawing system, and a control system according to the above for yawing the wind turbine rotor relative to the wind and/or for changing the pitch of the rotor blades.

The advantages of the control system and the wind turbine comprising such control system are as described in relation to the control method in the previous.

BRIEF DESCRIPTION OF THE DRAWINGS

In the following different embodiments of the invention will be described with reference to the drawings, wherein.

DETAILED DESCRIPTION OF THE DRAWINGS

Figure 1:
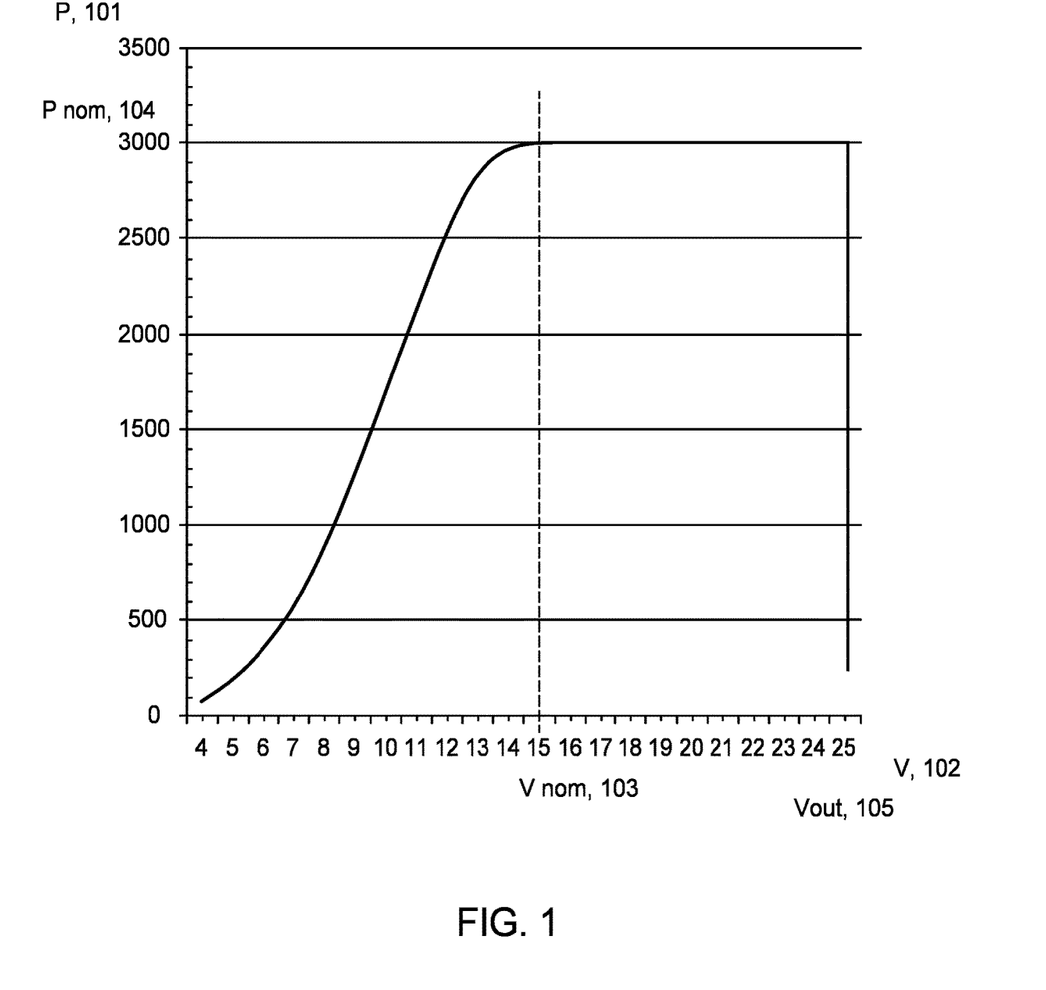
FIG. 1 shows an example of a conventional power curve during partial and full load operation, and above cut-out wind speeds.

FIG. 1 shows an example of a conventional or normal power curve with the power P, 101 shown as a function of the wind speed V, 102. At the lower wind speeds below the nominal wind speed $V_{nom}$, 103 and the nominal power $P_{nom}$, 104 (in this example a nominal wind speed of 15 m/s and a nominal power of 3000 kW) the wind turbine is under partial load operation where the wind turbine is controlled with a view to increase the power production. As can be seen from the FIG. 1, during partial load operation the power increases with increasing wind speeds until the nominal power of the wind turbine is reached. During full load operation at wind speeds above the nominal wind speed and/or when the power has reached the nominal power, the turbine is controlled by adjusting the pitch angles of the blades with a view to maintain the nominal power while reducing or controlling the loads on the turbine.

Generally, the wind turbine is therefore controlled according to partial load operation until a certain reference power is reached and the controlling is switched to full load operation. Most often the reference power is the same as the nominal power for the wind turbine but may under some conditions and in some situations like for example during unstable weather conditions, be reduced by a factor to increase the safety of the wind turbine. Likewise, the reference power may under some conditions be uprated by a factor for example during favourable weather conditions.

At too high wind speeds the loads on the wind turbine may become too large and the wind turbine is derated significantly or completely stopped. In the embodiment illustrated in FIG. 1, the wind turbine is stopped at the cut-out wind speed Vout, 105 of 25 m/s. At higher wind speeds the wind turbine is here in a production mode of non-production. The derating and/or stopping of the wind turbine is typically obtained by pitching the rotor blades out. As the wind turbine is stopped, the way the rotor affects the wind flow across the nacelle is therefore changes significantly. This has been seen to lead to significant drops in the measured wind speed in some situations in the order of 10 m/s. As the wind turbine is cut-out, the wind sensor may then suddenly measure an incorrect wind speed 10 m/s lower than the previously measured cut-out wind speed (here of 25 m/s) which again may cause the controller to start the wind turbine up again. Such disadvantageous and unintentional switching in the controlling of the wind turbine is avoided by taking the production mode of the wind turbine and hereby the rotor operation into account when determining the wind direction and wind speed used in determining the control parameters.

Figure 2:
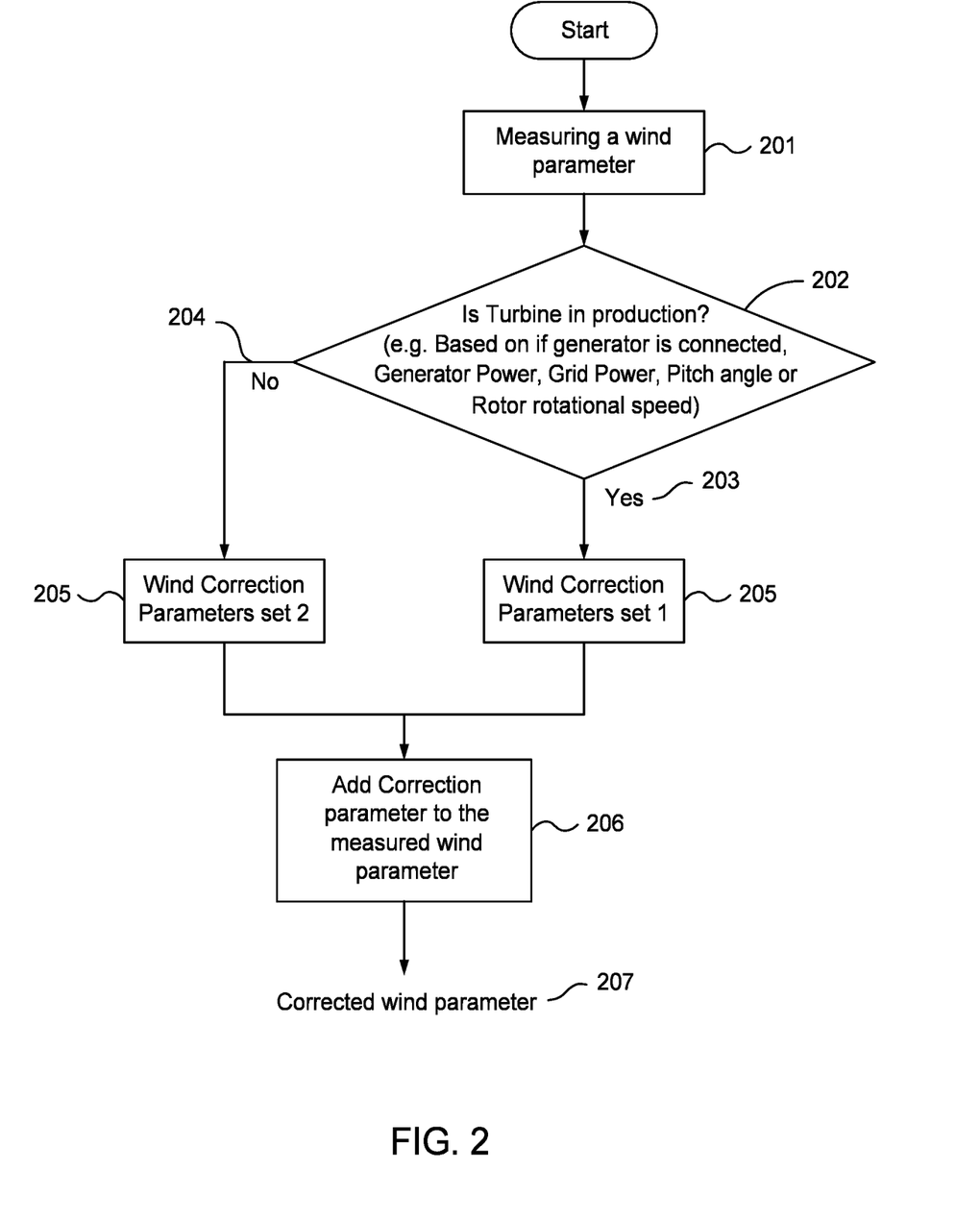
FIGS. 2-3 are flow charts illustrating embodiments of the invention.

FIG. 2 shows a flow chart illustrating the method steps performed in a control system, 200, of a wind turbine according to the invention. The control method comprises measuring a wind parameter by means of a wind sensor, 201. The wind parameter may be the wind direction relative to the wind turbine or the wind speed. In step 202 the production mode of the wind turbine is determined. In this example the production mode may be that of normal operation, 203, where the wind turbine is in production. Alternatively the wind turbine may be in a non-production mode, 204. The production mode may for example be determined based on the power (generator power or grid power), the pitch angle of the rotor blades (during non-production, the blades may be pitched out and the pitch angle above a certain level), or the rotational speed of the rotor. A set of wind correction parameters corresponding to the actual determined production mode is then obtained, 205, and the measured wind parameter is adjusted accordingly by means of the set of wind correction parameter, 206 to yield a more correct measure for the actual wind condition, 207. The adjusted wind parameter may then be used in the controlling of the wind turbine.

Figure 3:
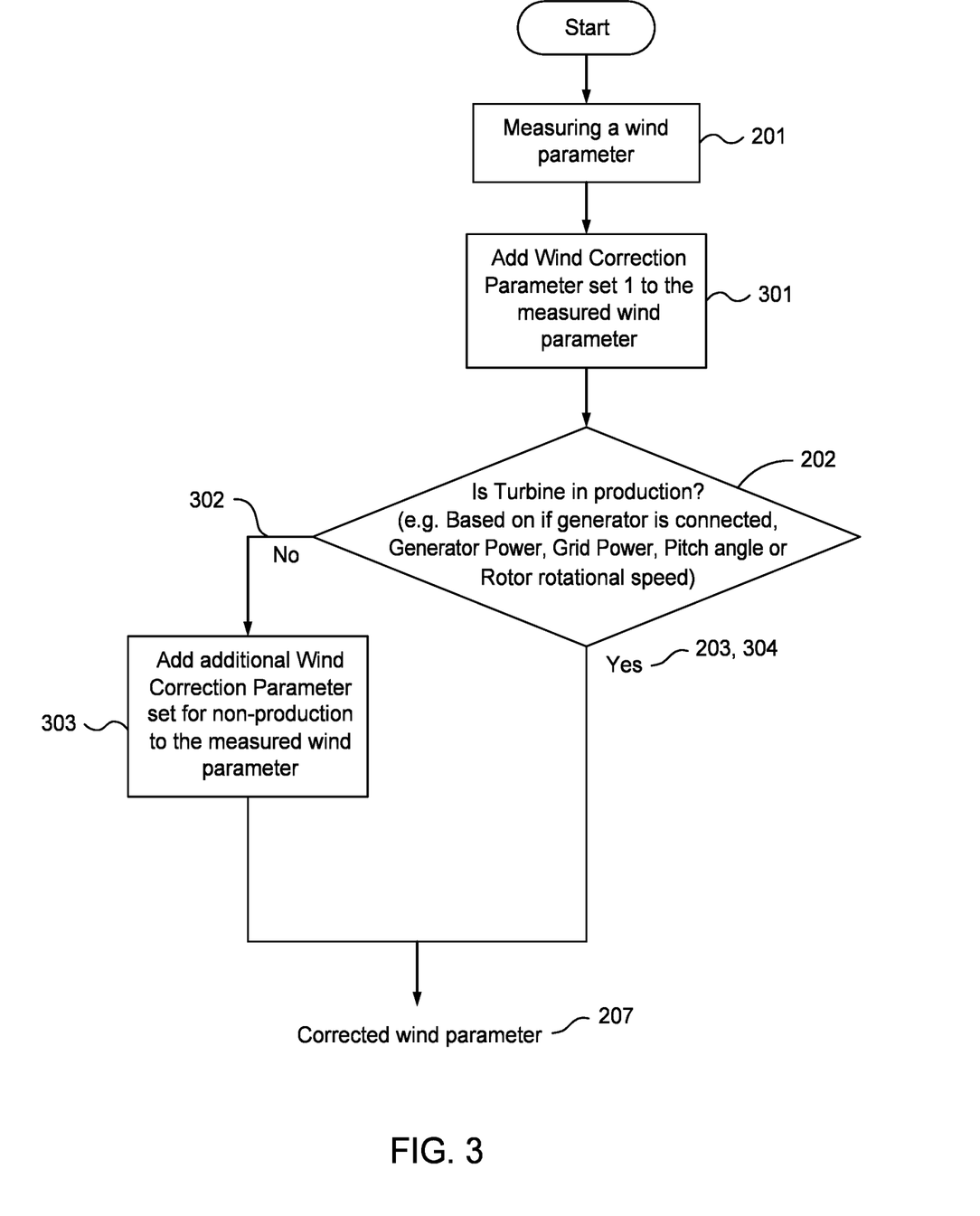

In the embodiment illustrated in FIG. 3, the measured wind parameter is in the same way adjusted by a set of wind correction parameters according to the actual production mode of wind turbine 202 at the time of adjustment. Only here the adjustment is performed by first adjusting the wind parameter according to the first set of wind correction parameters 301. Then, if the wind turbine is determined to be in a production mode different from the normal operation mode, 302, the wind parameter is further adjusted by the corresponding set of wind correction parameters, 303. Otherwise if the wind turbine is in production, 203, no further adjustment of the wind parameter is needed, 304.

In both embodiments of FIGS. 2 and 3 the measured wind parameter is adjusted based on a set of wind correction parameters corresponding to the actual production mode of the wind turbine. Also, the adjustment may be performed based on further production modes such as for example a production mode of idle operation. In this case the measured wind parameter during idle operation of the wind turbine is then adjusted based on a third set of wind correction parameters.

Figure 4:
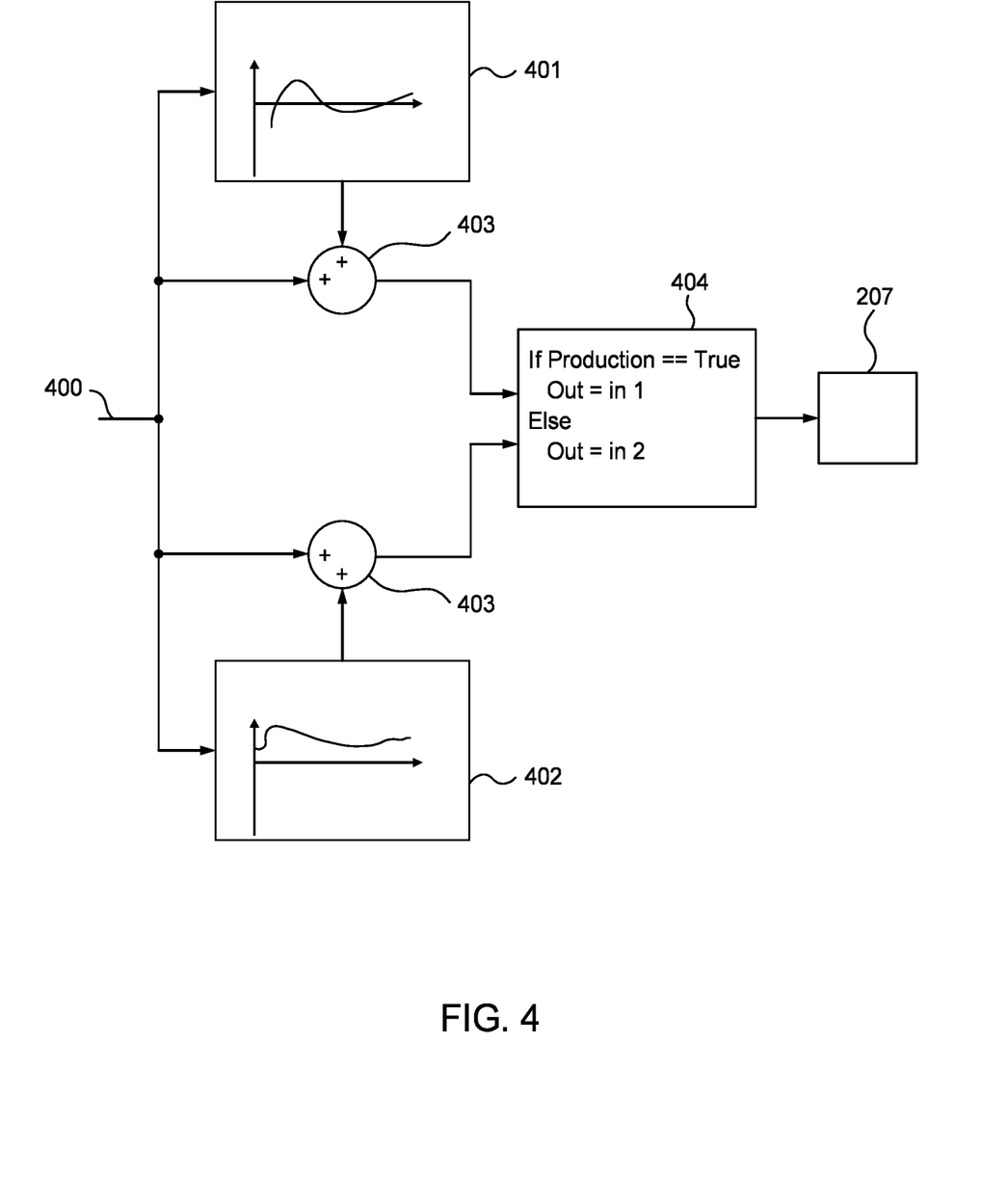
FIG. 4 illustrates the adjustment of the measured wind parameter according to an embodiment of the invention.

FIG. 4 illustrates the adjustment of the measured wind parameter or raw wind sensor data 400 in more detail. A pre-defined look-up table or set of wind correction parameters 401, 402 is here applied for each of the production modes of normal operation (or normal production) or non-production, respectively. The wind correction parameters of both sets of correction parameters are here given as a function of the wind speed, so that based on the raw wind speed determination 400, the wind parameter (wind speed and/or wind direction) is then adjusted by the addition of a wind correction parameter corresponding to that wind speed, 404. In the step 404, the actual production mode of the wind turbine determines which set of wind correction parameters and which adjustment of the wind parameter to use to yield the adjusted wind parameter.

Figure 5:
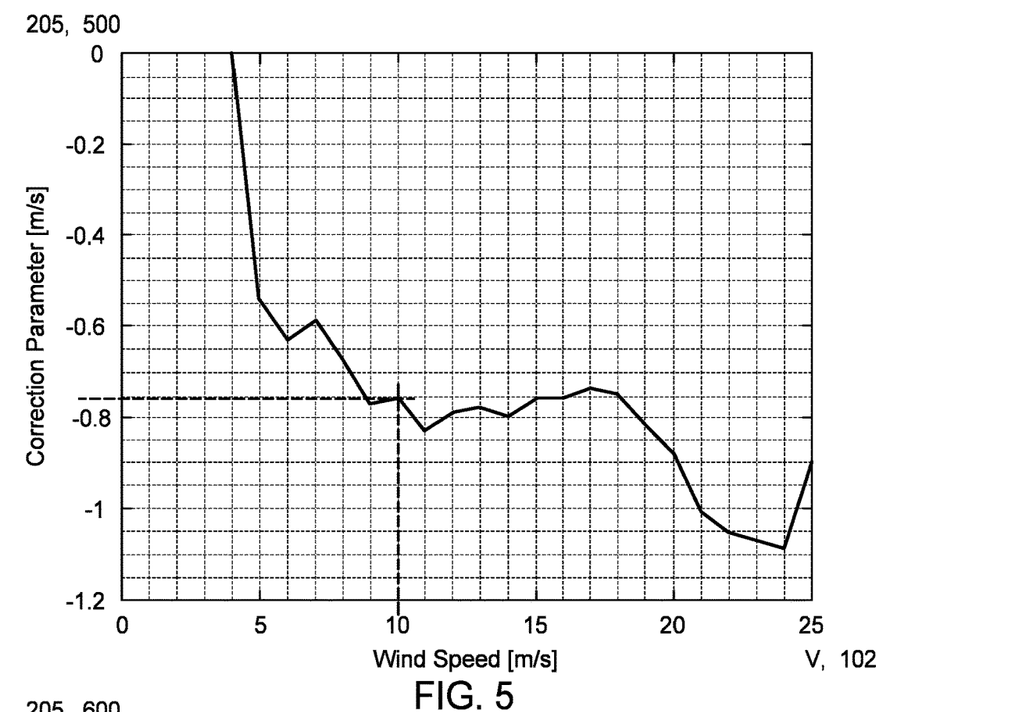
FIG. 5 shows a set of wind correction parameters for the wind speed and for the production mode of normal operation.
Figure 6:
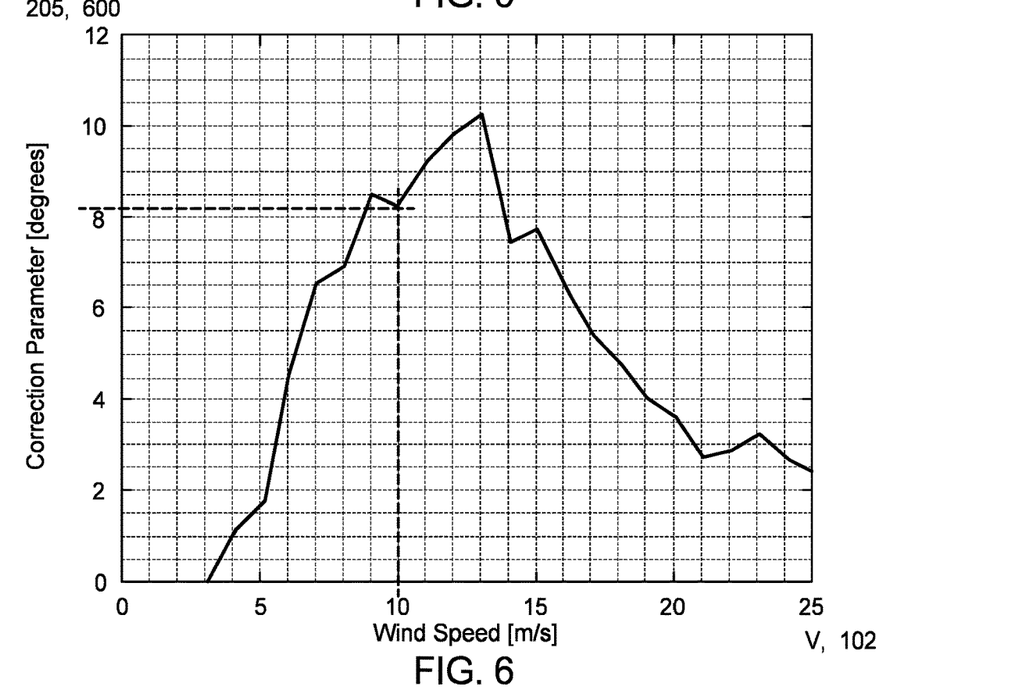
FIG. 6 shows a set of wind correction parameters for the wind direction and for the production mode of normal operation.

FIG. 5 and FIG. 6 each shows a set of wind correction parameters 205 for the production mode of normal operation. In FIG. 5 is shown the wind correction parameter for the wind parameter of the wind speed, 500, and in FIG. 6 is shown the wind correction parameter for the wind parameter of the wind direction, 600. In both cases the wind correction parameter is expressed as a function of the wind speed V, 102. As an example, during a normal operation mode of the wind turbine and for a measured wind speed V, 102 of 10 m/s (as indicated by the dashed line in the figure), the measured wind speed should be adjusted by approximately −0.75 m/s to yield a more precise wind speed which takes into account how the rotor operation affects the wind flow. Similarly, as seen from FIG. 6, the measured wind direction at a wind speed of 10 m/s should be adjusted by approximately 8 degrees as indicated by the dashed lines in the figure.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine, the wind turbine comprising a wind sensor, a number of pitch-adjustable rotor blades, a yawing system, and a control system for yawing a rotor of the wind turbine relative to the wind and for changing a pitch of the rotor blades, the method comprising:
   measuring a wind parameter by the wind sensor, wherein the wind parameter is indicative of a wind speed or a wind direction relative to the wind turbine;
   obtaining a pre-determined first set of wind correction parameters, the first set comprising wind correction parameters for adjustment of the wind parameter during normal operation;
   obtaining a pre-determined second set of wind correction parameters, the second set comprising wind correction parameters for adjustment of the wind parameter during non-production;
   determining that the wind turbine is in normal operation or non-production;
   adjusting the wind parameter based on the first set of wind correction parameters to produce a first adjusted wind parameter when the wind turbine is in normal operation;
   adjusting the wind parameter based on the second set of wind correction parameters to produce a second adjusted wind parameter when the wind turbine is in non-production;
   determining a control parameter of the wind turbine based on the first adjusted wind parameter when the wind turbine is in normal operation and based on the second adjusted wind parameter when the wind turbine is in non-production; and
   controlling the wind turbine according to the control parameter.

2. The method of controlling according to claim 1, wherein the wind sensor is an anemometer and the wind speed is measured by the anemometer.

3. The method of controlling according to claim 1, wherein the wind direction is measured by the wind sensor.

4. The method of controlling according to claim 1, wherein the wind correction parameters in the first set of wind correction parameters are a function of the wind speed.

5. The method of controlling according to claim 1, wherein the wind correction parameters in the first set of wind correction parameters are a function of a power of the wind turbine.

6. The method of controlling according to claim 1, wherein determining that the wind turbine is in normal operation or non-production is based on a power of the wind turbine.

7. The method of controlling according to claim 5, wherein the power of the wind turbine is determined from an output power of a generator of the wind turbine or a power delivered to a grid.

8. The method of controlling according to claim 1, wherein the wind turbine is determined to be in normal operation when a generator of the wind turbine is connected, or powering up, or in production.

9. The method of controlling according to claim 1, wherein determining that the wind turbine is in normal operation or non-production is based on a pitch angle of a rotor blade.

10. The method of controlling according to claim 1, wherein determining that the wind turbine is in normal operation or non-production is based on a rotational speed of the rotor.

11. The method of controlling according to claim 1, further comprising obtaining a pre-determined third set of wind correction parameters, the third set comprising wind correction parameters for adjustment of the wind parameter during idle operation, wherein the wind correction parameters of the third set are independent of a power of the wind turbine.

12. The method of controlling according to claim 1, where the wind parameter is further adjusted as a function of earlier wind parameters.

13. The method of controlling according to claim 1, where the control parameter comprises a pitch parameter of one or more of the rotor blades or a yaw parameter, and wherein the controlling of the wind turbine comprises pitching the rotor blades or yawing the rotor.

14. A control system for a wind turbine configured to perform an operation comprising:
   receiving a wind parameter as measured by a wind sensor, wherein the wind parameter is indicative of a wind direction relative to the wind turbine or a wind speed;
   receiving a pre-determined first set of wind correction parameters, the first set comprising wind correction parameters for adjustment of the wind parameter during normal operation;
   receiving a pre-determined second set of wind correction parameters, the second set comprising wind correction parameters for adjustment of the wind parameter during non-production;
   determining that the wind turbine is in normal operation or non-production;
   adjusting the wind parameter based on the first set of wind correction parameters to produce a first adjusted wind parameter when the wind turbine is in normal operation;
   adjusting the wind parameter based on the second set of wind correction parameters to produce a second adjusted wind parameter when the wind turbine is in non-production;
   determining a control parameter of the wind turbine based on the first adjusted wind parameter when the wind turbine is in normal operation and based on the second adjusted wind parameter when the wind turbine is in non-production; and
   controlling the wind turbine according to the control parameter.

15. A wind turbine comprising a wind sensor, a number of pitch-adjustable rotor blades, a yawing system, and a control system configured to perform an operation for yawing a rotor of the wind turbine rotor relative to the wind or for changing a pitch of the rotor blades, the operation comprising:
   receiving a wind parameter as measured by the wind sensor, wherein the wind parameter is indicative of a wind direction relative to the wind turbine or a wind speed;
   receiving a pre-determined first set of wind correction parameters, the first set comprising wind correction parameters for adjustment of the wind parameter during normal operation;
   receiving a pre-determined second set of wind correction parameters, the second set comprising wind correction parameters for adjustment of the wind parameter during non-production;

determining that the wind turbine is in normal operation or non-production;
adjusting the wind parameter based on the first set of wind correction parameters to produce a first adjusted wind parameter when the wind turbine is in normal operation;
adjusting the wind parameter based on the second set of wind correction parameters to produce a second adjusted wind parameter when the wind turbine is in non-production;
determining a control parameter of the wind turbine based on the first adjusted wind parameter when the wind turbine is in normal operation and based on the second adjusted wind parameter when the wind turbine is in non-production; and
controlling the wind turbine according to the control parameter.

* * * * *